Figure 1:
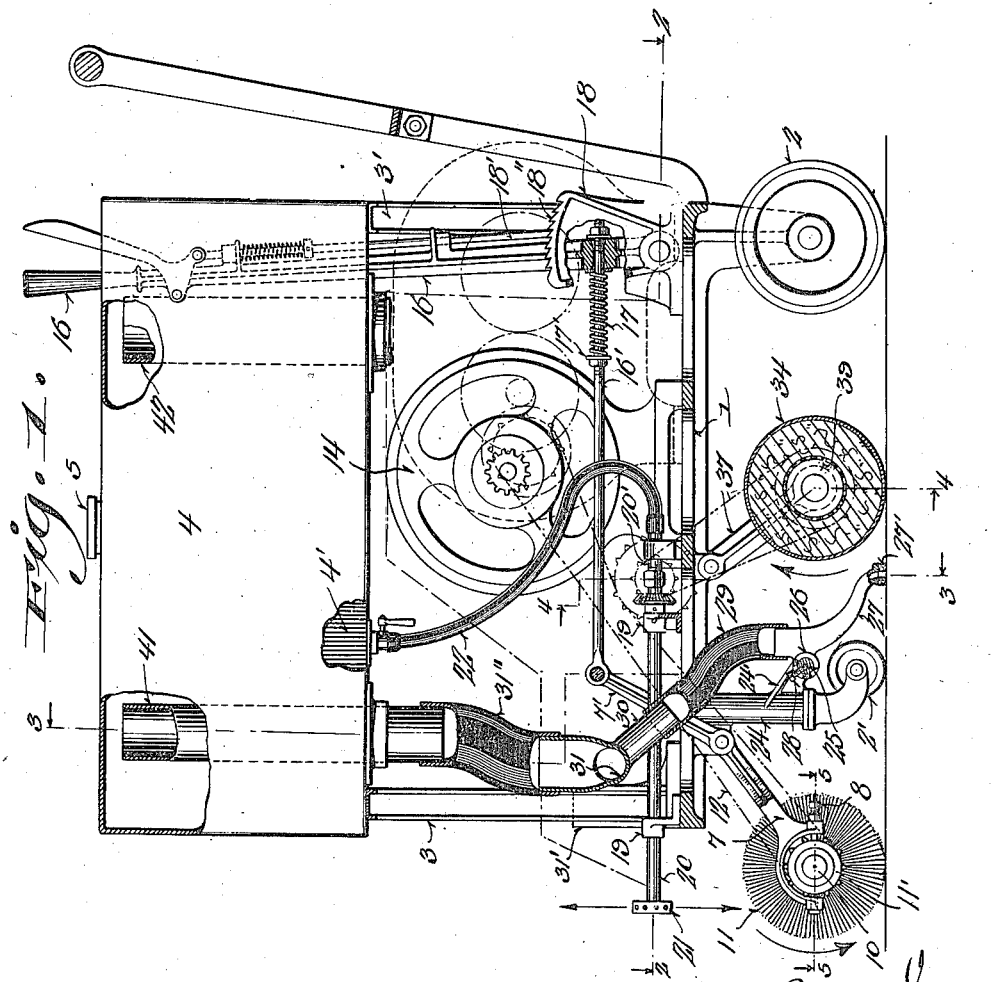

W. A. & H. H. SCHERFF.
SCRUBBING MACHINE.
APPLICATION FILED MAY 22, 1915.

1,176,990.

Patented Mar. 28, 1916.
3 SHEETS—SHEET 2.

Fig. 2.

Fig. 4.

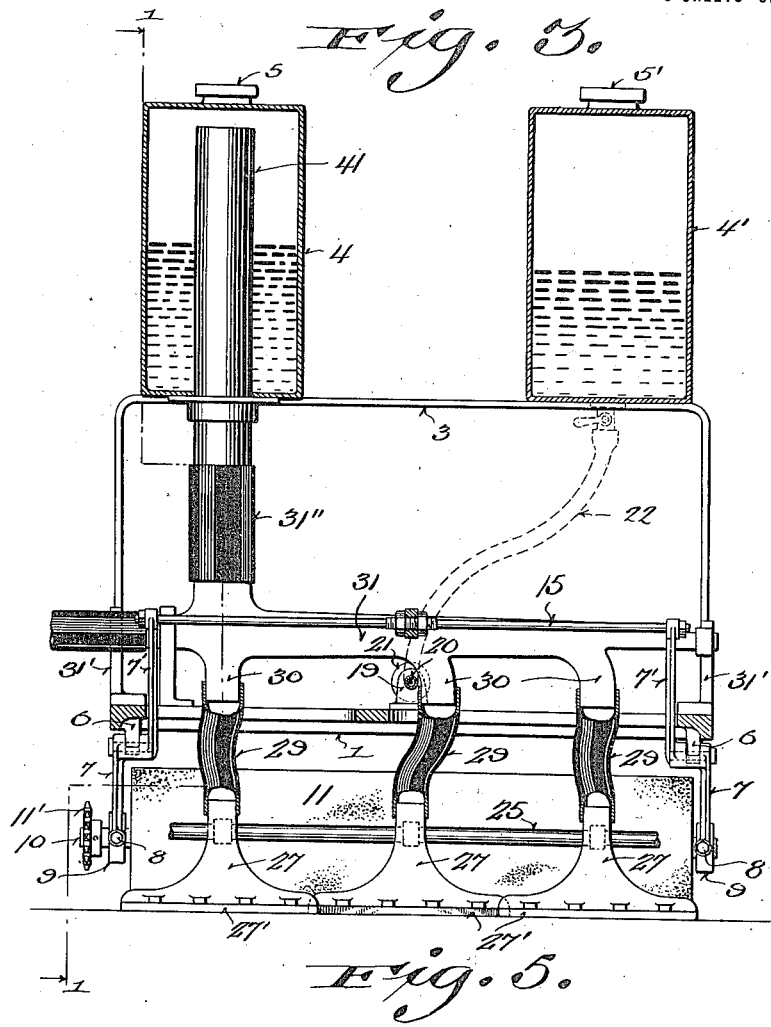

UNITED STATES PATENT OFFICE.

WALTER A. SCHERFF, OF WAUWATOSA, AND HENRY H. SCHERFF, OF MILWAUKEE, WISCONSIN.

SCRUBBING-MACHINE.

1,176,990.   Specification of Letters Patent.   Patented Mar. 28, 1916.

Application filed May 22, 1915. Serial No. 29,718.

*To all whom it may concern:*

Be it known that we, WALTER A. SCHERFF and HENRY H. SCHERFF, both citizens of the United States, and residents of Wauwatosa, in the county of Milwaukee and State of Wisconsin, and of Milwaukee, in the county of Milwaukee and State of Wisconsin, respectively, have invented certain new and useful Improvements in Scrubbing-Machines; and we do hereby declare that the following is a full, clear, and exact description thereof.

Our invention has for its object to provide a simple, economical and effective portable scrubbing machine, the same embodying means for taking up the refuse water from the floor and means for drying the floor after being scrubbed.

With the above objects in view the invention consists in certain peculiarities of construction and combination of parts as set forth hereinafter with reference to the accompanying drawings and subsequently claimed.

In the drawings Figure 1 represents a sectional elevation of a machine embodying the features of our invention, the section being indicated by line 1—1 of Figs. 2 and 3; Fig. 2, a sectional plan view of the same, the plane of the section being generally indicated by line 2—2 of Fig. 1; Fig. 3, a cross-section through the machine looking toward the front, the section being indicated by line 3—3 of Fig. 1; Fig. 4, a detailed elevation of a mopping roller with parts broken away and in section, as indicated by line 4—4 of Fig. 1, and Fig. 5, an enlarged detailed view of one end of the scrubbing roll embodying one of the features of our invention.

Referring by characters to the drawings, 1 represents the skeleton platform of a truck supported by rear wheels 2 and front casters 2'. The platform has extending therefrom front and rear standards 3, 3', respectively, for the support of a refuse water tank 4 and a fresh water tank 4', each of said tanks being closed with the exception that they are provided with cap-closed apertures 5, 5'. The forward end of the platform has depending ears 6, to which are pivotally secured companion levers having forwardly extended arms 7 and rearwardly extended arms 7'. The forwardly extended arms terminate with spanners, as best shown in Figs. 1 and 5, which spanners carry pivot pins 8 that serve as oscillatory mountings for a bearing ring 9. The bearing rings 9 constitute journals for a shaft 10 provided with ball-races and a suitable set of antifriction balls that are interposed between the races and ring 9. This shaft has rigidly secured thereto a rotary bristle-brush 11 and the same is driven by a sprocket wheel 11', which is fast upon one end of the shaft, being connected by an endless chain 12 to a sprocket-wheel 12', which is mounted upon an arbor that receives its drive from a suitable train of gears that constitute part of a rotary pump 13, as best shown in Fig. 2. The details of the pump form no part of our invention and therefore are not described or shown. The pump, however, is driven by a suitable gear connection to a motor 14, which is mounted upon the platform 1, as is also the casing of the pump.

The rearward arms 7' of the brush-carrying levers are connected by a tie-rod 15 and this tie-rod is connected to a controlling lever 16 by a rod 16', the end of the rod being extended through an aperture that is formed in the controlling lever and secured by a suitable nut. A spring 17 is interposed between the actuating lever and a collar 17' adjustably mounted upon the rod 16', whereby a certain amount of elasticity is had between the controlling lever and the brush-carrying lever to thus adjust the pressure of the brush upon the floor and permit a certain amount of flexure or yield. The controlling lever is pivotally mounted in a bracket 18 that is fixed to the platform, and a spring-controlled detent 18' that is carried by the lever 16 is adapted to engage any one of a series of notches 18" in the bracket, whereby the rotary brush, when adjusted to the floor or raised therefrom may be locked in such adjusted position.

Mounted in suitable bearings 19 that project from the platform, is a rotary hollow spindle 20, one end of which spindle projects forwardly and over the brush 11, terminating with a perforated water-distributing head 21 which is rotatable vertically and adapted to throw a spray of water upon and about the brush throughout its length. The rear end of the spindle 20 is coupled to a fixed tube section 20' which is suitably supported from the platform and this tube section is connected by a flexible hose 22 to the bottom of the fresh water tank 4', as best shown in Fig. 1. Thus water from the fresh water tank is caused to flow by gravity to the head 21. In order to facilitate the distribution of the water and cause it to be discharged over a comparatively large area in proportion to the quantity, the spindle 20 is arranged to be rotated and, with this in view, is in miter-gear connection with a counter-shaft 23, as best shown in Fig. 2, which shaft carries a large sprocket-wheel 23' that meshes with one stretch of the chain belt 12, whereby rotary motion is transmitted to the spindle.

The caster legs 24 are formed with rearwardly extended ears 24', into which is rigidly secured a cross-rod 25. This cross-rod is arranged to receive sleeve portions 26 of a series of independent suction feet 27, the mouths of which suction feet are, as shown, adapted to ride upon the surface to be cleaned and may be provided with suitable soft shoes 27', whereby the proper amount of suction may be induced to cause waste or refuse water to be drawn upwardly through the shoes by a vacuum mechanism to be hereinafter described. Each of these shoes is arranged to oscillate upon the cross-rod 25 and the limit of movement in each instance is controlled by a stud pin 28 which is carried by the rod and projects through a suitable slot that is formed in the sleeve 26 of each member. The upper end of each shoe is connected by a flexible hose section 29 to a companion nozzle 30, the series constituting branches of a main suction pipe 31 that is suitably affixed to the platform by brackets 31'. One end of this suction pipe is closed and the opposite end is open and connected by a section of hose 32 to the fixed tubular member 33 of a trunnion coupling. The rotary member 33' constitutes one trunnion of a cylindrical mop 34, the outer end of the hollow trunnion member 33' being suitably anchored in the coupling, which coupling is supported by a leg 36 that forms part of an arm 36', one branch of which arm also serves as a bearing for the rotary coupling member 33'. This arm, together with a corresponding arm 37 is pivotally mounted in connection with depending ears with which the platform is provided and the free end of the arm 37 forms a bearing for a solid trunnion 37', which is in axial alinement with the trunnion 33'. These two trunnions terminate with flanges 38 which form heads of a perforated tube 39 that constitutes the hollow core of the soft-bodied mop-roller 34, the same being more or less porous and provided with an outer porous jacket whereby the body or filler is held in cylindrical formation. Thus it will be seen that the roller mop is suspended from the platform rearwardly of the suction shoes and adapted to ride or float, whereby its weight will cause the outer surface thereof to press gently against the floor to be cleaned. In order to increase the mopping efficiency of the roller 34, it is preferable to rotate the same in the direction opposite to that of travel of the machine, and opposite to that of the rotary brush 11, which direction in each instance is indicated by the arrows in Fig. 1 of the drawing. With this in view rotary motion is imparted to the mop roller by a gear-wheel 40 which is in link-belt connection with a smaller gear-wheel 40' that is fast upon the counter-shaft 23. Thus it will be seen that all of the rotary parts receive their drive primarily from the motor 14 and the machine as a whole can thus be readily manipulated by an operator due to the fact that its traction is not utilized as a power element for driving the various mechanisms.

The suction pipe 31 is connected by a boot 31" to a suction pipe 41, which pipe extends through the bottom of the tank 4 with its mouth at a predetermined distance from the top of the tank and above the water level. A similar suction pipe 42 is extended through the refuse tank with its open end in a position corresponding to the open end of the pipe 41 and the lower end of the last mentioned suction pipe 42 which projects through the bottom of the tank 4 is connected to the pump 13, as indicated in dotted lines in Fig. 1 and in full lines in Fig. 2 of the drawings.

Thus it will be seen from the foregoing description that when the apparatus is in operation water will be caused to flow into the head 21 and be distributed about the rotary scrubbing brush 11. After the scrubbing operation is completed, the refuse water will be taken up by the suction apparatus constituting the several boots 27 and their connections to the collecting tank 4. This suction of water into the tank is effected by the pump 13, which, when in action causes a partial vacuum to be maintained in said tank that is sufficient to draw the water upward through pipe 41, whereby it will overflow from the mouth of the pipe to a predetermined level, which level will not rise to cut off the mouth of pipe 41 owing to the fact that the water collected will be at all times slightly less in volume than the water distributed from the fresh water tank 4' as these tanks are arranged to be of approximately the same capacity. After the surplusage of waste water has been taken up from the floor by the vacuum apparatus, the floor will be thoroughly dried by the action of the mopping roller 34, which action follows the suction operation and the spongy substance of the roller will absorb the moisture upon the floor and such moisture will be extracted by the action of the vacuum mechanism due to the hose connection 32 with the suction pipe 31. Hence the water is extracted from the mop through the perforated pipe 39, hollow trunnion 33' and from thence this waste water is discharged into the refuse tank 4 in a similar manner to that described in connection with the refuse water taken up by the suction shoes 27.

While we have shown and described a complete operative mechanism for carrying out our invention in all its details, it should be understood that we may vary such details of construction or eliminate certain elements without departing from the spirit of our invention.

We claim:

1. A scrubbing apparatus comprising a truck having a refuse water tank and a fresh water tank mounted thereon, a brush carried by the truck, a revoluble water-distributing spindle in communication with the fresh water tank and in juxtaposition to the brush, a suction foot positioned rearwardly of the brush, a revoluble mop positioned rearwardly of the suction foot, the foot and mop being in pipe connection with the refuse water tank, and a vacuum producer in communication with said refuse water tank.

2. A scrubbing apparatus comprising a truck having a refuse water tank and a fresh water tank mounted thereon, a driven rotary brush carried by the truck, means for yieldingly adjusting the brush to the surface to be scrubbed, a revoluble water-distributing head positioned in juxtaposition to said brush in communication with the fresh water tank, a series of suction feet oscillatorily mounted upon the truck, a suction pipe connection between the foot and refuse tank, a suction producer in communication with said refuse water tank, a hollow cylindrical mop suspended from the platform positioned rearwardly of the suction feet and brush, means for imparting rotation to the mop, and a suction pipe connection between the hollow mop and the aforesaid refuse water tank.

In testimony that we claim the foregoing we have hereunto set our hands at Milwaukee, in the county of Milwaukee and State of Wisconsin.

WALTER A. SCHERFF.
HENRY H. SCHERFF.